No. 775,953. PATENTED NOV. 29, 1904.
M. VOIGT & A. R. FRANK.
PROCESS OF MAKING METALLIC CYANIDS.
APPLICATION FILED DEC. 23, 1902.
NO MODEL.
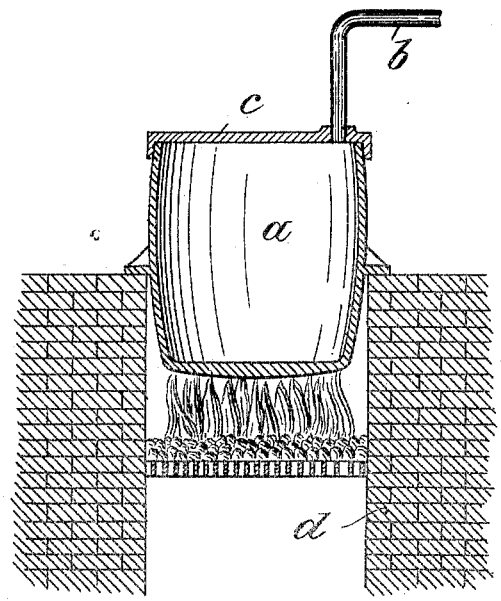

No. 775,953. Patented November 29, 1904.

UNITED STATES PATENT OFFICE.

MAX VOIGT, OF CHARLOTTENBURG, AND ALBERT R. FRANK, OF BERLIN, GERMANY, ASSIGNORS TO THE FIRM CYANID-GESELLSCHAFT MIT BESCHRAENKTER HAFTUNG, OF BERLIN, GERMANY.

PROCESS OF MAKING METALLIC CYANIDS.

SPECIFICATION forming part of Letters Patent No. 775,953, dated November 29, 1904.

Application filed December 23, 1902. Serial No. 136,412. (No specimens.)

*To all whom it may concern:*

Be it known that we, MAX VOIGT, residing at 28 Teltowerstrasse, Berlin, and ALBERT R. FRANK, residing at 26 Berlinerstrasse, Charlottenburg, Kingdom of Prussia, German Empire, subjects of the King of Prussia, Emperor of Germany, have invented new and useful Improvements in Processes of Manufacturing Metal Cyanids, of which the following is a specification.

This invention relates to a process for obtaining metallic cyanids.

The process consists in the following steps: first, in treating metallic cyanamids with water. From the solution thus obtained the free cyanamids are separated, then dried and heated up to the melting-point in presence of metals, metallic oxids, or metallic salts, and the temperature is maintained so high that the mixture remains liquid.

In the accompanying drawing an apparatus to be used for carrying out our process is illustrated in vertical section.

*a* is a crucible; *b*, an exhaust; *c*, the cover of the crucible; *d*, a furnace.

Already before this it has been proposed to convert metallic cyanamids into cyanids by heating metallic cyanamids together with carbon and metallic compounds as fluxes up to melting-point. By this process, however, only impure metallic cyanids can be obtained, requiring a further depuration. If, however, the metallic cyanamids are beforehand treated with water or other suitable solvents and the thus obtained free cyanamids (which contain cyanamid and its polymers as dicyanamid, melamin, sometimes mixed up together) melted in presence of metals, metallic oxids, metallic hydroxids, or metallic salts metallic cyanids of such a degree of purity are obtained that they can be used for most industrial purposes without requiring any further depuration. The above process is especially suitable for obtaining alkaline cyanids, especially cyanids of sodium and of potassium. As most suitable for the use as metals or metallic compounds have been found the easily-fusible metals and their easily-fusible oxids and salt—as, for instance, metallic potassium, sodium, hydroxid of potassium or of sodium, carbonate of potassium or of sodium, &c. These can all be employed either singly or mixed up with each other. We further have found that the amount of metallic cyanid obtained can be increased by adding carbonaceous substances to the mixture of cyanamid and metals or metallic compounds, either as carbon or as a compound of carbon—as, for instance, as carbohydrogen. Either liquid, solid, or gaseous carbohydrogens can be used. So, for instance, coal-gas, mineral oils, paraffin, and vaseline have been found suitable. The carbonaceous substance can be added before heating and the heating process then be proceeded with. However, the carbonaceous substance can also be added while heating the mixture of cyanamids with metals or metallic compounds by adding a carbohydrogen to the heated mixture. So, for instance, coal-gas or another carbonaceous gas could be conducted into the mixture. The amount of carbonaceous substance is suitably so chosen that there is to each atom of hydrogenized nitrogen one atom of carbon.

In the present process the nitrogen that is not bound as metallic cyanid generally escapes as ammonia or compounds of nitrogen. These can be conducted into a separate receptacle and be further utilized. It has further been found advantageous to heat the cyanamid with the metallic compounds under pressure. The heating of the mixture can be done under pressure from the commencement, or the heating can be commenced under ordinary atmospheric pressure and the pressure be increased during the process of heating. The skilled workman will find the necessary temperature and the respective quantities by experiment. The temperature and the required quantities are different for each metallic cyanid. It has further been found advantageous to add such substances as will accelerate the fusion. So, for instance, any flux, as common salt, (sodium chlorid,) cyanid of potassium, cyanid of sodium, &c., can be added from the beginning or during the process.

In the following the manner of obtaining cyanid of sodium is described to illustrate the manner of carrying out the process. A suitable metallic cyanamid—as, for instance, cyanamid of calcium or sodium or barium or lead—is leached with water. Cyanamid of calcium is obtained—for instance, by conducting nitrogen into a mixture of lime and carbon, which is heated to about 2,000° centigrade. Cyanamid of bariums can be obtained by letting ammoniac gas act on carbonate of barium. The metallic cyanamids are advantageously treated with water, either boiling or cold. We may, however, separate the basis chemically, (by means of carbonic acid, sulfureted hydrogen, &c.) The solution is then separated from any remaining sediment and brought to crystallization—for instance, by cooling the solution or evaporating same. A skilled workman will easily find the suitable metallic cyanamid, the necessary amount of water or the chemical means for decomposing the metallic cyanamid, and the best manner of separating the cyanamid. The cyanamids are advantageously dried and mixed with metallic compounds—as, for instance, carbonate of sodium. A suitable mixture is as follows: one part of weight cyanamid, one part of weight carbonate of sodium. The mixture is placed into a suitable vessel—for instance, the crucible $a$, which is provided with an exhaust-tube $b$ and covered by the lid $c$. The crucible is placed into the furnace $d$ and heated. First, ammonia or compounds of nitrogen will escape by the exhaust $b$, then the whole contents will melt, and the heating is continued so long until all is well liquid. Then the process is completed. The cyanid obtained can be poured out of the vessel when still liquid and can, if necessary, be separated by filtration from such carbon as has remained intact.

The reactions during this process are probably similar to the following equations:

First. In using metallic sodium:

$$2Na+2(CNNH_2)=2NaCN+NH_3+H+N.$$

Second. In using metallic sodium and carbonaceous substances:

$$2Na+CNNH_2+C=2NaCN+2H.$$

Third. When using hydroxid of sodium and carbonaceous substances:

(a)

$$NaOH+CNNH_2+C=NaCN+NH_3+CO$$

(or b)

$$2NaOH+CNNH_2+C=2NaCN+2H_2O.$$

Fourth. When using carbonate of sodium:

$$Na_2CO_3+2CNNH_2=$$
$$2NaCN+NH_3+N+CO_2+O+H.$$

Fifth. When using carbonate of sodium and carbonaceous substances:

$$Na_2CO_3+CNNH_2+2C=2NaCN+2CO+H_2O.$$

In the above equations the suffix $n$ has been applied to signify that the molecular quantity of the substances employed is unknown. Exactly in the same manner as the cyanamid its polymers will react.

Instead of mixing the substances and then heating them the process can be carried out by bringing the cyanamid into the molten metallic alkali or alkalic compound, or a molten metallic alkali or alkalic compound can be poured on a cyanamid equally melted beforehand. Also in this manner of proceeding carbonaceous substances or fluxes separately or mixed with each other may be added.

What we claim as our invention, and desire to secure by Letters Patent, is—

1. A process for obtaining metallic cyanids which consists in dissolving cyanamid from metallic cyanamids, separating the solution from the sediment, formed in the dissolution of the cyanamid, separating the cyanamid from the solution and heating the separated cyanamid up to melting-point in presence of inorganic substances containing the base whose cyanid it is desired to produce.

2. A process for obtaining metallic cyanids which consists in dissolving cyanamid from metallic cyanamids, separating the solution from the sediment formed in the dissolution of the cyanamid, separating the cyanamid from the solution and heating the separated cyanamid up to melting-point in presence of easily-fusible compounds of metal whose cyanid it is desired to produce.

3. A process for obtaining metallic cyanids which consists in dissolving cyanamid from metallic cyanamids, separating the solution from the sediment formed in the dissolution of the cyanamid, separating the cyanamid from the solution and heating the separated cyanamid up to melting-point in presence of inorganic substances containing the base whose cyanid it is desired to produce and carbon.

4. A process for obtaining metallic cyanids which consists in dissolving cyanamid from metallic cyanamids, separating the solution from the sediment formed in the dissolution of the cyanamid, separating the cyanamid from the solution and heating the separated cyanamid up to melting-point in presence of inorganic substances containing the base whose cyanamid it is desired to produce and carbonaceous compounds.

5. A process for obtaining metallic cyanids which consists in dissolving cyanamid from metallic cyanamids, separating the solution from the sediment formed in the dissolution of the cyanamid, separating the cyanamid from the solution and heating the separated cyanamid up to melting-point in presence of inorganic substances containing the base whose cyanid it is desired to produce, flux-powders and carbonaceous compounds.

6. A process for obtaining metallic cyanids which consists in dissolving cyanamid from metallic cyanamids, separating the solution from the sediment formed in the dissolution of the cyanamid, separating the cyanamid from the solution and heating the separated cyanamid up to melting-point under pressure in presence of inorganic substances containing the base whose cyanid it is desired to produce.

7. A process for obtaining metallic cyanids which consists in dissolving cyanamid from metallic cyanamids, separating the solution from the sediment formed in the dissolution of the cyanamid, separating the cyanamid from the solution and heating the separated cyanamid up to melting-point under pressure in presence of inorganic substances containing the base whose cyanid it is desired to produce and carbonaceous compounds.

8. A process for obtaining metallic cyanids which consists in dissolving cyanamid from metallic cyanamids, separating the solution from the sediment formed in the dissolution of the cyanamid, separating the cyanamid from the solution and heating the separated cyanamid up to melting-point under pressure in presence of inorganic substances containing the base whose cyanid it is desired to produce, carbonaceous compounds and flux-powders.

In witness whereof we have hereunto signed our names, this 6th day of December, 1902, in the presence of two subscribing witnesses.

MAX VOIGT.
ALBERT R. FRANK.

Witnesses:
HENRY HASPER,
WOLDEMAR HAUPT.